(12) United States Patent
Miller

(10) Patent No.: US 7,649,886 B2
(45) Date of Patent: Jan. 19, 2010

(54) METHOD AND SYSTEM FOR PROCESSING INCOMING PACKETS IN A COMMUNICATION NETWORK

(75) Inventor: Karl E. Miller, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 667 days.

(21) Appl. No.: 11/284,072

(22) Filed: Nov. 21, 2005

(65) Prior Publication Data

US 2007/0115988 A1 May 24, 2007

(51) Int. Cl.
*H04L 12/28* (2006.01)
(52) U.S. Cl. .................. 370/392; 370/400; 709/224
(58) Field of Classification Search .................. None
See application file for complete search history.

(56) References Cited

U.S. PATENT DOCUMENTS

| | | | |
|---|---|---|---|
| 2002/0023171 A1* | 2/2002 | Garrett et al. | 709/238 |
| 2004/0054925 A1* | 3/2004 | Etheridge et al. | 713/201 |
| 2005/0021740 A1* | 1/2005 | Bar et al. | 709/224 |

* cited by examiner

*Primary Examiner*—Jayanti K Patel
*Assistant Examiner*—Jung Park

(57) ABSTRACT

A method and electronic device (104) for processing incoming packets in a communication network (100) is disclosed. The method includes filtering (302) incoming packets in real time by using a recent offender list (212). The method also includes classifying (304) the incoming packets as offending packets and non-offending packets in non-real time.

8 Claims, 3 Drawing Sheets

METHOD AND SYSTEM FOR PROCESSING INCOMING PACKETS IN A COMMUNICATION NETWORK

FIELD OF THE INVENTION

The present invention relates in general to communication networks, and more specifically, to a method and system for filtering packets in a communication network.

BACKGROUND OF THE INVENTION

In recent times, communication networks, for example, Cellular Radio Access Networks have grown extensively. Electronic devices, for example, mobile phones, connected to a communication network, communicate with each other, for example, by sending and receiving packets. A packet includes, for example, a source address corresponding to the source of the packet in the communication network, and a destination address corresponding to the destination of the packet in the network.

A communication network can be vulnerable to problems, such as, IP address scanning, which can have adverse impacts on the communication network and its users. During IP address scanning, an electronic device may send multiple packets in the communication network to scan the addresses of other electronic devices. Packets being sent by electronic devices to scan the addresses of other electronic devices are known as offending packets. Once the address of an electronic device is verified by the process of IP address scanning, the electronic device can be accessed by various means for illicit purposes. As a result, the offending packets need to be blocked in the communication network.

During address scanning, there can be a sudden increase in the communication network traffic. This adversely affects the performance of the communication network, since a large number of offending packets need to be processed. Further, address scanning is a security breach for the electronic devices in the communication network.

There are various methods available for blocking an offending packet in the communication network. In one such method, a firewall identifies and blocks the offending packets. Conventional firewalls employ complex techniques; as a result, they require a large amount of processing power and time. Consequently, these firewalls cannot be used efficiently in an embedded environment, such as in a cellular network, where less processing power and processing time are available.

BRIEF DESCRIPTION OF THE FIGURES

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF THE INVENTION

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

A detailed description of an exemplary application, namely a 'Method and System for Processing Incoming Packets in a Communication Network', is provided as a specific enabling disclosure that may be generalized to any application of the disclosed system, method and device for processing incoming packets, in accordance with various embodiments of the present invention.

Various embodiments of the present invention provide a method and a firewall system for processing incoming packets in a communication network. Each incoming packet is associated with a source address and a destination address. The method includes the steps of filtering the incoming packets in real time, using a recent offender list, and classifying the incoming packets as offending packets and non-offending packets in non-real time. The firewall system includes a processor and a memory unit. The memory unit can be operatively coupled with the processor. The processor is capable of filtering the offending packets from the incoming packets in real time, and classifying an incoming packet as an offending packet or a non-offending packet in non-real time.

Figure 1:
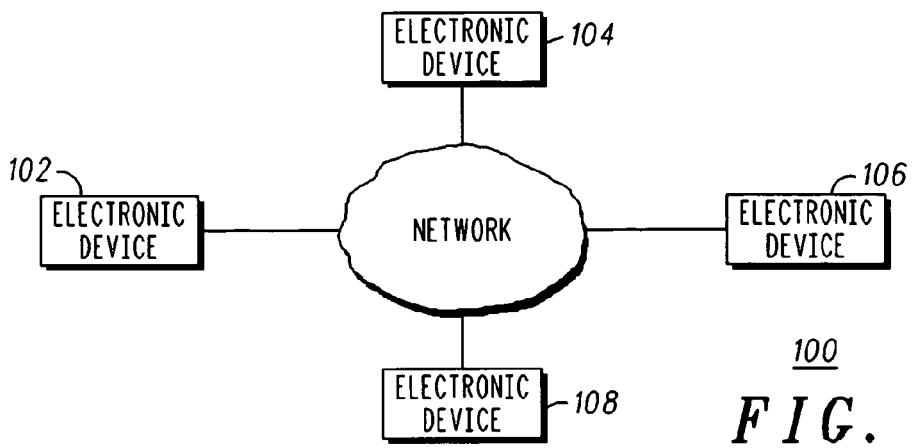
FIG. 1 representatively illustrates a block diagram of a communication network, where various embodiments of the present invention may be practiced.

FIG. 1 representatively illustrates a block diagram of a communication network 100, where various embodiments of the present invention may be practiced. The communication network 100 includes a plurality of electronic devices, for example, an electronic device 102, an electronic device 104, an electronic device 106, and an electronic device 108. Examples of the communication network 100 include, but are not limited to, a Local Area Network (LAN), a Metropolitan Area Network (MAN), a Wide Area Network (WAN), the Internet, a mobile communication network, a cellular radio access network, and a cellular core network. In an embodiment, the communication network 100 comprises a plurality of such communication networks which are interlinked. For example, when a user of a mobile phone accesses internet through the mobile phone, a mobile communication network and the Internet can form the communication network 100. Examples of the electronic devices 102, 104, 106, and 108 include, but are not limited to, Personal Computers (PCs), mobile phones, laptops, network routers, and network servers.

In an embodiment, an electronic device may be a network electronic device that supplies service to other electronic devices, for example user devices. Network electronic devices may include network routers, network servers, Radio Access Network (RAN) functions, gateway functions, Packet Control functions, and the like. As such, in an embodiment, a network serving function may be coupled between an electronic device 102, 104, 106, 108 and the network. In an embodiment, electronic devices may include user devices coupled to receive service from network devices. User devices may include PC, cellular phones, Personal Digital Assistants (PDA's), wireless interfaces for PCs, wireless interfaces for PDA's, and the like.

The electronic devices 102, 104, 106, and 108 in the communication network 100 send and receive packets to communicate with each other. For example, the electronic device 102 may send a packet to the electronic device 106. The packet includes, for example, a source address and a destination address. In this example, the source address includes the address of the electronic device 102 and the destination address includes the address of the electronic device 106. In an embodiment of the present invention, an electronic device, for example, the electronic device 102 may send packets to multiple destinations. For many network environments, especially radio access networks, no devices would be sending packets to a high number of destinations in a single given period of time, except for some number of devices which are well known, such as an application server supporting the network for multicast, or short message service, for example. Because of this characteristic of the environment, it is possible to classify packets as offending packets when the number of destinations associated with the source address of the electronic device 102 might exceed a predefined threshold value. The predefined threshold is the maximum allowable number of packets that can be sent by an electronic device in a known time interval. In this embodiment, the packets sent by an electronic device 102 which exceeds the predefined threshold are identified as offending packets.

Figure 2:
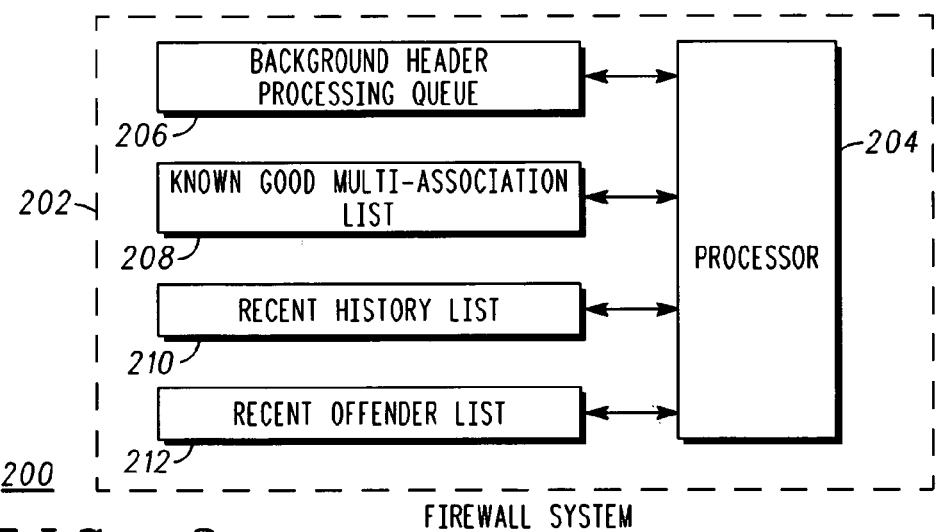
FIG. 2 representatively illustrates a block diagram of a firewall system, in accordance with an exemplary embodiment of the present invention.

FIG. 2 representatively illustrates a block diagram of a firewall system 200, in accordance with an exemplary embodiment of the present invention. The firewall system 200 includes a memory unit 202 and a processor 204. The processor 204 is operatively coupled with the memory unit 202. The memory unit 202 includes a background header processing queue 206, a known good multi-association list 208, a recent history list 210, and a recent offender list 212. The background header processing queue 206 includes the source addresses and destination addresses of the incoming packets for classifying the incoming packets. The known good multi-association list 208 includes the source addresses of the good non-offending electronic devices, which are allowed to be sending multiple packets that are more than the predefined threshold value in the communication network 100, for valid reasons, for example, a Push-to-Talk server in a cellular core network. The recent history list 210 includes the source addresses and corresponding destination addresses associated with the source addresses of recent incoming packets. The recent offender list 212 includes the source addresses of packets recently identified as offending packets. The processor 204 processes the incoming packets, based on the information retrieved from the background header processing queue 206, the known good multi-association list 208, the recent history list 210, and the recent offender list 212.

In an embodiment of the present invention, processing the incoming packets is split into two phases, for example, a low processing intensive phase and a high processing intensive phase. In the low process-intensive phase, the offending packets are blocked by the processor 204, based on the information retrieved from the recent offender list 212. In the high processing intensive phase, the processor 204 classifies the incoming packets as offending packets and non-offending packets, using the known good multi-association list 208 and the recent history list 210. In another embodiment of the present invention, the low processing intensive phase is implemented in real time and the high processing intensive phase is implemented in non-real time.

Figure 3:
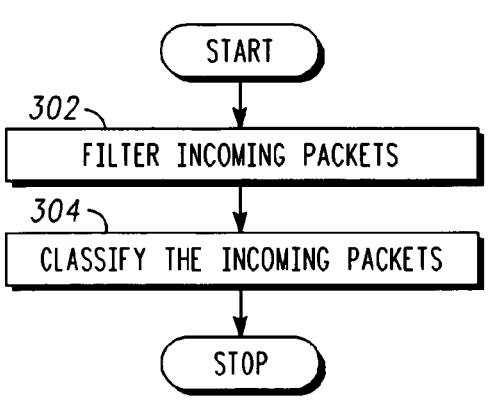
FIG. 3 representatively illustrates a flowchart depicting a method for processing incoming packets, in accordance with a first exemplary embodiment of the present invention.

FIG. 3 representatively illustrates a flowchart depicting a method for processing incoming packets, in accordance with a first exemplary embodiment of the present invention. At step 302, incoming packets are filtered in real time by using the recent offender list 212. The incoming packets are filtered, if necessary, by blocking one or more packets. The source addresses of these packets are present in the recent offenders list 212. This requires detection of the offending packets in the incoming packets. At step 304, information concerning previous incoming packets are used to classify addresses associated with offending packets and non-offending packets in non-real time. In an embodiment of the present invention, the incoming packets are classified on the basis of the number of destination addresses associated with the source address of each of the incoming packets. In this embodiment, the recent history list 210 is used to store the number of destination addresses associated with the source address of each of the incoming packets.

Figure 4:
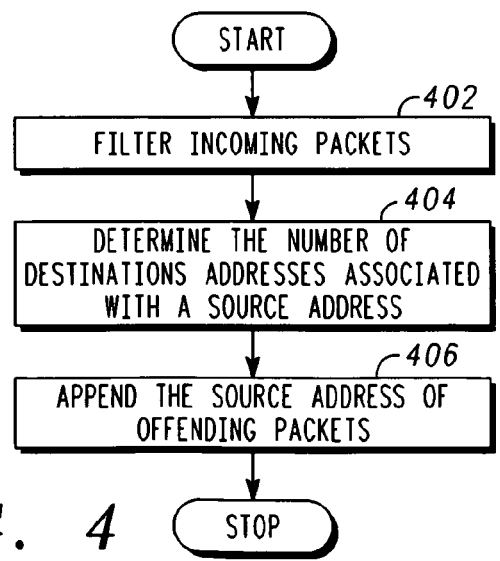
FIG. 4 representatively illustrates a flowchart depicting a method for processing incoming packets, in accordance with a second exemplary embodiment of the present invention.

FIG. 4 representatively illustrates a flowchart depicting a method for processing incoming packets, in accordance with a second exemplary embodiment of the present invention. At step 402, the incoming packets are filtered in real time by using the recent offender list 212. The incoming packets are filtered, if necessary, by blocking one or more packets. The source addresses of these packets are present in the recent offenders list 212. This requires detection of the offending packets in the incoming packets. In an embodiment of the present invention, the offending packets can be detected by classifying the incoming packets, based on the number of destination addresses associated with the source address of each of the incoming packets. At step 404, the number of destination addresses associated with the source address of a packet is determined in non-real time. In an embodiment of the present invention, the number of destination addresses associated with the source address of an incoming packet is determined by using the recent history list 210. In an embodiment of the present invention, an incoming packet is identified as an offending packet, when the number of destination addresses associated with the source address of the incoming packet exceeds a predefined threshold value. After the incoming packet is identified as the offending packet, step 406 is performed. At step 406, the source address of the incoming packet is appended to the recent offenders list 202 in non-real time.

Figure 5:
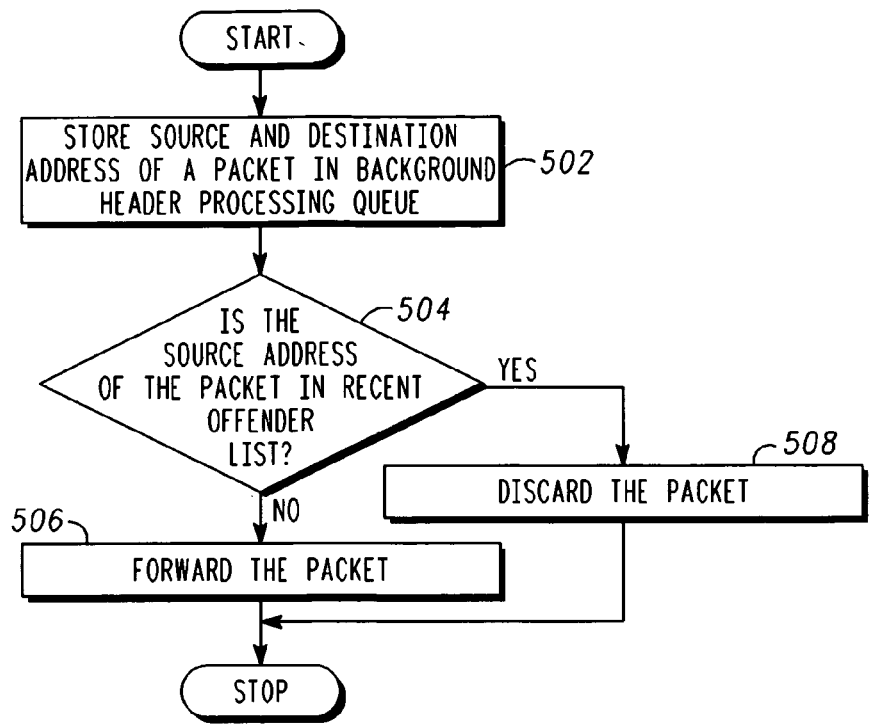
FIG. 5 representatively illustrates a flowchart depicting a method for filtering incoming packets, in accordance with an exemplary embodiment of the present invention.

FIG. 5 representatively illustrates a flowchart depicting a method for filtering incoming packets, in accordance with an exemplary embodiment of the present invention. The process of filtering the incoming packets is implemented in real time. Filtering the incoming packets comprises blocking the offending packets present in the incoming packets by using the recent offender list 212. At step 502, the source and destination addresses of an incoming packet are stored in the background header processing queue 206. The source and destination addresses stored can be used, at a later point in time if desired, to identify whether the incoming packet is an offending packet or a non-offending packet. Further, at step 504, it is determined whether the source address of the incoming packet is present in the recent offender list 212. The recent offender list 212 includes a list of source addresses of packets that have already been identified as offending packets. If it is determined at step 504, that the source address of the incoming packet is not present in the recent offenders list 212, then the incoming packet is forwarded to an electronic device corresponding to the destination address of the incoming packet at step 506. If it is determined at step 504 that the source address of the incoming packet is present in the recent offenders list 212, then the incoming packet is discarded at step 508.

Figure 6:
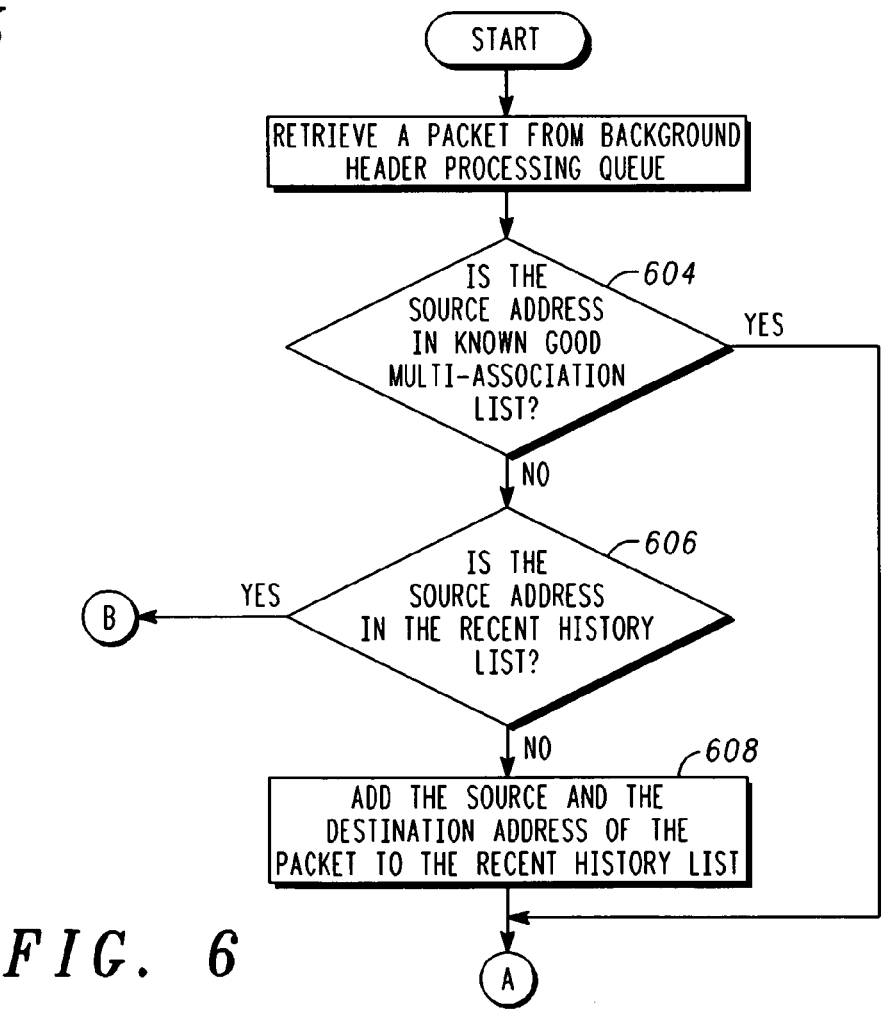
FIGS. 6 and 7 representatively illustrate a flowchart depicting a method for classifying incoming packets, in accordance with an exemplary embodiment of the present invention.
Figure 7:
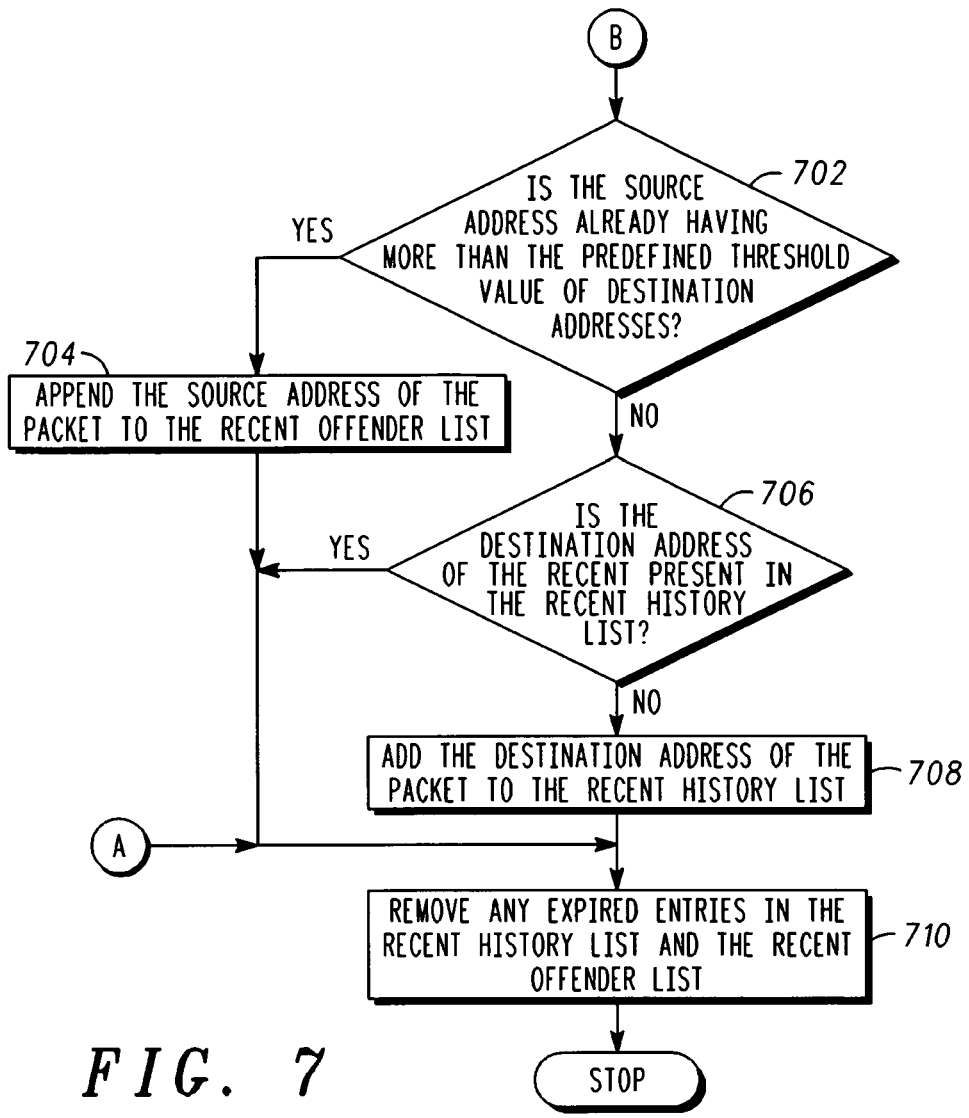

FIGS. 6 and 7 representatively illustrate a flowchart depicting a method for classifying incoming packets, in accordance with an exemplary embodiment of the present invention. The process of classifying the incoming packets as offending packets and non-offending packets is implemented in non-real time. Classifying the incoming packets includes determining the number of destination addresses associated with a source address of the incoming packets by using the recent history list 210. At step 602, the source and destination addresses of an incoming packet are retrieved from the background header processing queue 206. At step 604, it is determined whether the source address of an incoming packet is present in the known good multi-association list 208. If the source address is present in the known good multi-association list 208, then step 710 is performed. At step 710, the expired entries are removed from the recent history list 210 and the recent offenders list 212. In an embodiment, removing the expired entries comprise, deleting one or more source addresses or one or more destination addresses present in the recent history list 210 or the recent offenders list 212 for more than a known period of time. This may done, for example and without limitation, by time tagging each entry as it is entered into the table, and then discarding any packet whose time tag is older than a specified amount of time (which an be the allowed entry age). This is similar to how IP addresses or MAC addresses are "timed out" of routing tables or caches. If the source address is not present in the known good multi-association list 208, then step 606 is performed. At step 606, it is determined whether the source address is present in the recent history list 210. If the source address is not present in the recent history list 210, then, at step 608, the source address and destination address of the packet is added to the recent history list 210. Further, step 710 is performed; at step 710, the expired entries are removed from the recent history list 210 and the recent offender list 212. If the source address is present in the recent history list 210, then, it is determined at step 702 whether the number of destination addresses associated with the source address of the packet is more than a predefined threshold value. If it is, then, at step 704, the source address of the packet is appended to the recent offender list 212. Further, step 710 is performed; at step 710, the expired entries are removed from the recent history list 210 and the recent offender list 212. If the number of destination addresses associated with the source address of the packet is less than the predefined threshold value, then step 706 is performed. At step 706, it is determined whether the destination address of the packet is present in the recent history list 210. If the destination address of the packet is present in the recent history list 210, then the expired entries are removed from the recent history list 210 and the recent offenders list 212 at step 710. If the destination address of the packet is not present in the recent history list 210, then step 708 is performed. At step 708, the destination address of the packet is added to the recent history list 210. In an embodiment, destination addresses added to the recent history list may be associated with a specific source address in the list, enabling the distinction of which multiple destination addresses are associated with which source addresses. At step 710, the expired entries are removed from the recent history list 210 and the recent offenders list 212.

Figure 8:
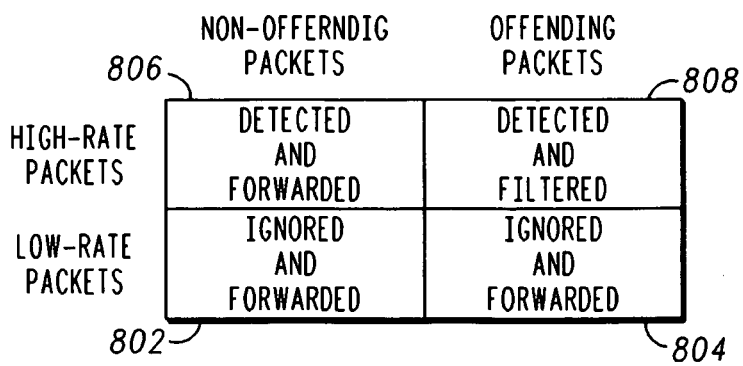
FIG. 8 representatively illustrates a classification of incoming packets, in accordance with various exemplary embodiments of the present invention.

FIG. 8 representatively illustrates a classification of incoming packets, in accordance with various exemplary embodiments of the present invention. In an embodiment, the incoming packets can be divided into four major categories, based on the incoming packet rate, for example, high-rate packets or low-rate packets, and the type of incoming packets, for example, offending packets or non-offending packets. These incoming packets can be classified into the following classes: low-rate non-offending packets 802, low-rate offending packets 804, high-rate non-offending packets 806, and high-rate offending packets 808. In an embodiment, the low-rate non-offending packets 802 and the low-rate offending packets 804 can be ignored and forwarded to their respective destinations. Further, the high-rate non-offending packets 806 can be detected, but once identified as non-offending packets, by using the recent history list and/or the known good multi-association list 208, can be forwarded to their respective destinations. Only the high-rate offending packets 808 are identified and filtered, as they are mainly concerned with processes such as address scanning.

Various embodiments of the present invention provide a method and system for reducing the processing power and time needed to filter an incoming packet. In an embodiment of the present invention, the incoming packets are filtered in real time and classified into offending packets and non-offending packets in non-real time. Filtering of packets, being less processor intensive, can be implemented in real time with little impact to latency and capacity. Classification of packets, being more processor intensive, is implemented in non-real time, when otherwise idle processing resources can be utilized. This minimizes impacts on latency and capacity.

Various embodiments of the present invention can be used in a communication network, for example, a Code Division Multiple Access (CDMA) network. In an embodiment, the present invention can be implemented in the Packet Control Function (PCF) of the CDMA network, in which the processing capacity is limited and less processing time is required. In another embodiment, the present invention can be implemented in one or more of the electronic devices connected to the communication network 100.

It will be appreciated that the firewall system described herein may be comprised of one or more conventional processors and unique stored program instructions that control the one or more processors to implement, in conjunction with certain non-processor circuits, some, most, or all of the functions of the firewall system described herein. The non-processor circuits may include, but are not limited to, signal drivers, clock circuits, power source circuits, and user input devices. As such, these functions may be interpreted as steps of a method to perform processing of incoming packets in a communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention has been described with reference to specific exemplary embodiments. It will however be appreciated that various modifications and changes may be made without departing from the scope of the present invention, as set forth in the following claims. The specification and figures are to be regarded in an illustrative manner, rather than a restrictive one, and all such modifications are intended to be included within the scope of the present invention. Accordingly, the scope of the invention should be determined by the claims appended hereto and their legal equivalents, rather than merely by the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations, to produce substantially the same result as the present invention, and are therefore not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. A method for processing incoming packets in a communication network, each packet having a source address and a destination address, the method comprising:

filtering the incoming packets in real time using a recent offender list; and classifying the filtered incoming packets as offending packets and non-offending packets in non-real time based on:

retrieving a source address and a destination address of a packet from a background header processing queue;

checking if the source address of the packet is present in a known good multi-association list; terminating any further processing for the source address when the source address is present in the known good multi-association list;

checking if the source address is present in a recent history list;

adding the source address to the recent history list when the source address is not present in the recent history list;

checking if the number of destination addresses associated with the source address of the packet in the recent history list is more than a predefined threshold value; adding the source address of the packet to the recent offender list if the number of destination addresses associated with the source address of the packet is more than the predefined threshold value; and updating the recent history list with the source address and the destination address of the packet when the number of destination addresses associated with the source address of the packet is less than the predefined threshold value and the destination address associated with the source address is not already present in the recent history list.

2. The method according to claim 1, wherein filtering the incoming packets comprises blocking one or more packets when the recent offender list has the source address of the one or more packets.

3. The method according to claim 1 further comprising storing source addresses and destination addresses of the incoming packets in the background header processing queue in real time for classifying the incoming packets.

4. The method according to claim 1 further comprising maintaining the known good multi-association list of source addresses of non-offending packets, wherein each of the source addresses is associated with multiple destination addresses.

5. The method according to claim 4 further comprising allowing the packet to pass through when the source address of the packet is included in the known good multi-association list.

6. The method according to claim 1 further comprising periodically updating the recent offender list and the recent history list.

7. The method according to claim 6, wherein periodically updating the recent offender list and the recent history list comprises removing any expired entries in the recent offender list and the recent history list.

8. A firewall system for processing incoming packets in a communication network, the firewall system comprising:

a processor capable of filtering offending packets from the incoming packets in real time, and classifying the filtered incoming packets as an offending packet and a non-offending packet in non-real time based on a number of destination addresses associated with the source address of each of the filtered packets; and a memory unit operatively coupled with the processor, the memory unit comprising:

a header processing queue capable of storing source and destination addresses of the incoming packets;

a recent offender list capable of storing source addresses of offending packets;

a known good multi-association list capable of storing source addresses of non-offending multi associated packets; and a recent history list capable of storing source and destination addresses of recently received packets, wherein the processor is further capable of classifying the filtered incoming packets based on:

retrieving a source address and a destination address of a packet from the background header processing queue;

checking if the source address of the packet is present in the known good multi-association list; terminating any further processing for the source address when the source address is present in the known good multi-association list;

checking if the source address is present in the recent history list;

adding the source address to the recent history list when the source address is not present in the recent history list;

checking if the number of destination addresses associated with the source address of the packet in the recent history list is more than a predefined threshold value; adding the source address of the packet to the recent offender list if the number of destination addresses associated with the source address of the packet is more than the predefined threshold value; and updating the recent history list with the source address and the destination address of the packet when the number of destination addresses associated with the source address of the packet is less than the predefined threshold value and the destination address associated with the source address is not already present in the recent history list.

\* \* \* \* \*